(12) United States Patent
Zehavi et al.

(10) Patent No.: US 9,996,486 B2
(45) Date of Patent: Jun. 12, 2018

(54) DATA TRANSFER RATE ADJUSTMENT

(71) Applicant: SANDISK TECHNOLOGIES LLC, Plano, TX (US)

(72) Inventors: Mordekhay Zehavi, Raanana (IL); Mahmud Asfur, Bat-Yam (IL); Rustam Freidel, Kfar Vradim (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 216 days.

(21) Appl. No.: 14/925,638

(22) Filed: Oct. 28, 2015

(65) Prior Publication Data

US 2017/0124007 A1 May 4, 2017

(51) Int. Cl.
  *G06F 13/00* (2006.01)
  *G06F 13/16* (2006.01)
  *G06F 13/40* (2006.01)

(52) U.S. Cl.
  CPC ...... *G06F 13/1689* (2013.01); *G06F 13/4068* (2013.01)

(58) Field of Classification Search
  CPC .................................................. G06F 2201/86
  See application file for complete search history.

(56) References Cited

U.S. PATENT DOCUMENTS

| 5,745,106 | A * | 4/1998 | Chandavarkar ........... G06F 1/08 331/57 |
| 7,075,276 | B2 | 7/2006 | Morales |
| 8,743,613 | B2 * | 6/2014 | Wang ................... G11C 7/1066 365/185.11 |
| 2009/0164677 | A1 * | 6/2009 | Ware .................... G06F 13/4243 710/104 |

OTHER PUBLICATIONS

Gillespie et al., "5.5 Steamroller: An x86-64 Core Implemented in 28nm Bulk CMOS", 2014 IEEE International Solid-State Circuits Conference Digest of Technical Papers (ISSCC), Feb. 9-13, 2014, pp. 104-105, Abstract, 2 pages.
Kurd et al., "Next Generation Intel Core Micro-Architecture (Nehalem) Clocking", IEEE Journal of Solid-State Circuits, vol. 44, No. 4, Apr. 2009, pp. 1121-1129, Abstract, 2 pages.
Zhang et al., "Evaluating Adaptive Clocking for Supply-Noise Resilience in Battery-Powered Aerial Microrobotic System-on-Chip", IEEE Transactions on Circuits and Systems I: Regular Papers, vol. 61, No. 8, Mar. 31, 2014, pp. 2309-2317, Abstract, 2 pages.
Bowman, et al., "A 22nm All-Digital Dynamically Adaptive Clock Distribution for Supply Voltage Droop Tolerance", IEEE Journal of Solid-State Circuits, vol. 48, No. 4, Apr. 4, 2013, pp. 1-10.

(Continued)

*Primary Examiner* — Hyun Nam
*Assistant Examiner* — Juanito Borromeo
(74) *Attorney, Agent, or Firm* — Kunzler, PC (57) ABSTRACT

A storage device may be configured to adjust a frequency of a clock signal. The clock signal may be associated with a data transfer rate of data to be communicated between a controller and a memory of the storage device. In some implementations, the frequency maybe adjusted responsive to at least one of a supply voltage provided to the storage device, a temperature of the storage device, or a physical characteristic of the storage device.

26 Claims, 6 Drawing Sheets

(56) References Cited

OTHER PUBLICATIONS

Fischer, et al., "A 90-nm Variable Frequency Clock System for a Power-Managed Itanium Architecture Processor", IEEE Journal of Solid-State Circuits, vol. 41, No. 1, Jan. 1, 2006, 218-228.

Floyd, et al., "Introducing the Adaptive Energy Management Features of the Power7 Chip", IEEE Micro, vol. 31, No. 2, Mar.-Apr. 2011, 16 pages.

Grenat, et al., "Adaptive Clocking System for Improved Power Efficiency in a 28 nm x86-64 Microprocessor", IEEE International Solid-State Circuits Conference Digest of Technical Papers (ISSCC), Feb. 9-13. 2014, 106-108.

Grochowski, et al., "Microarchitectural Simulation and Control of di/dt-Induced Power Supply Voltage Variation", Eighth International Symposium on High-Performance Computer Architecture, Feb. 2-6, 2002, 10 pp.

Gupta, et al., "An Event-Guided Approach to Reducing Voltage Noise in Processors", Design Automation & Test in Europe Conference & Exhibition, Apr. 20-24, 2009, 6 pages.

Herbert, et al., "Variation-Aware Dynamic Voltage/Frequency Scaling", IEEE 15th International Symposium on High Performance Computer Architecture, Feb. 14-18, 2009, 301-312.

Casazza, "First the Tick, Now the Tock" Intel Microarchitecture (Nehalem), White Paper, Intel Xeon processor 3500 and 5500 series, Intel Microarchitecture, http://www.intel.com/content/dam/doc/white-paper/intel-microarchitecture-white-paper.pdf, retrieved on Oct. 28, 2015, 8 pp.

Kanter, "Adaptive Clocking in AMD's Steamroller", http://www.realworldtech.com/steamroller-clocking/, May 6, 2014, 3 pages.

Lu, et al., "Control-Theoretic Dynamic Frequency and Voltage Scaling for Multimedia Workloads", Proceedings of the 2002 International Conference on Compilers, Architecture, and Synthesis for Embedded Systems, 2002, 8 pages.

Rountree, et al., "Beyond DVFS: A First Look at Performance Under a Hardware-Enforced Power Bound", IEEE 26th International Parallel and Distributed Processing Symposium Workshops & PhD Forum, May 21-25, 2012, 9 pp.

Kim, et al., "System Level Analysis of Fast, Per-Core DVFS Using On-Chip Switching Regulators", IEEE 14th International Symposium on High Performance Computer Architecture, Feb. 16-20, 2008, 12 pages.

Zhao, et al., "Thermal-Aware Voltage Droop Compensation for Multi-Core Architectures", Proceedings of the 20th symposium on Great lakes symposium on VLSI, 2010, 6 pages.

\* cited by examiner

DATA TRANSFER RATE ADJUSTMENT

FIELD OF THE DISCLOSURE

This disclosure is generally related to adjusting a rate of transferring data in a data storage device.

BACKGROUND

Non-volatile storage devices, such as flash memory devices, have enabled increased portability of data and software applications. For example, flash memory devices can enhance data storage density by storing multiple bits in each cell of the flash memory. To illustrate, Multi-Level Cell (MLC) flash memory devices provide increased storage density by storing clock 3 bits per cell, 4 bits per cell, or more. Electronic devices, such as mobile phones, typically use non-volatile storage devices, such as flash memory devices, for persistent storage of information, such as data and program code that is used by the electronic device. Advances in technology have resulted in increased storage capacities of non-volatile storage devices with reductions in storage device size and cost.

A data storage device may receive a supply voltage from an access device (e.g., a host device) via a power supply line. In some implementations, at least one other device, such as another data storage device, a peripheral device, etc., may be coupled to the power supply line. The supply voltage received by the data storage device may experience a low voltage condition resulting from operation of the data storage device and/or the at least one other device. For example, an increase in data processing (e.g., power consumption) at the data storage device may cause a low voltage condition associated with the supply voltage at the data storage device. As another example, the low voltage condition may result from power consumption at the at least one other device. The low voltage condition may impact performance of the data storage device, such as by reducing a switching speed of transistors within the data storage device.

During operation of the data storage device, data may be communicated between a controller and a memory of the data storage device via a data bus that couples the controller and the memory. For example, one or more data values may be provided to or received from the data bus at a transfer rate based a frequency of a clock signal. To illustrate, a first data value may be provided to the data bus from the controller in response to a rising edge of the clock signal. As another example, a second data value may be received from the data bus and stored at the controller in response to a falling edge of the clock signal. Operations performed at the data storage device, such as data transfer operations, may be impaired by reduced transistor switching speed of transistors used to provide data to the data bus and/or to receive data from the data bus. For example, errors may result if a data transfer rate between the controller and the memory is too high for the transistors to provide the data to the data bus or receive the data from the data bus. To account for reduced transistor speed caused by low voltage conditions, the data transfer rate (e.g., the frequency of the clock signal) may be set to a fixed value that corresponds to a low voltage condition. Setting the data transfer rate to the fixed value may avoid errors that may occur if the data transfer rate is too high for the transistors (i.e., the data transfer rate may be set based on a worst-case scenario). Thus, performance (e.g., the data transfer rate) of the data storage device is limited to handle potential low voltage conditions (regardless of the actual value of the supply voltage).

DETAILED DESCRIPTION

Particular aspects of the present disclosure are described below with reference to the drawings. In the description, common features are designated by common reference numbers. Although certain examples are described herein with reference to a data storage device, it should be appreciated that techniques described herein are applicable to other implementations. Further, it is to be appreciated that certain ordinal terms (e.g., "first" or "second") may be provided for ease of reference and do not necessarily imply physical characteristics or ordering. Therefore, as used herein, an ordinal term (e.g., "first," "second," "third," etc.) used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "examplary" may indicate an example, an implementation, and/or an aspect, and should not be construed as limiting or as indicating a preference or a preferred example, implementation, and/or aspect.

The present disclosure describes systems and methods of setting a frequency of a clock signal associated with a data transfer rate of data to be communicated between a controller and a memory of a data storage device. The controller may include an interface circuit that couples the controller to the memory via a communication path, such as a data bus. In some implementations, the frequency may be generated by a clock generator (e.g., an interface clock), such as an input/output (I/O) clock. To set (or adjust) the frequency of the clock signal, the controller may determine a performance metric associated with the data storage device. The performance metric may be representative of a switching speed of a transistor. The performance metric may be affected based on a structure (e.g., physical characteristics) of the data storage device, a device temperature, a supply voltage (received from an access device), or a combination thereof, as illustrative, non-limiting examples.

To illustrate, the controller may include a performance detector circuit that is configured to determine the performance metric related to a switching speed of at least one transistor of a plurality of transistors. For example, the performance detector circuit may include a chain circuit configured to receive a reference signal and to propagate the reference signal through at least a portion of the chain circuit during a time period. The performance detector circuit may determine a value of the performance metric based on how far the signal propagates through the chain circuit during the time period.

The data storage device may set (or adjust) the frequency of the clock signal based on the determined performance metric. For example, the controller of the data storage device may include a frequency adjuster circuit that is configured to receive the performance metric and to adjust, based on the performance metric, the frequency of the clock signal generated by the clock generator. After setting the frequency, the data storage device may transfer data between the memory and the controller at a transfer rate based on the frequency. For example, to send data from the controller to the memory, the controller may output a data value to the communication path (e.g., the data bus) based on a first transition (e.g., a rising edge) of the clock signal that has the frequency. As another example, to receive data at the controller from the memory, the controller may store a data value received via the communication path based on a second transition (e.g., a falling edge) of the clock signal that has the frequency.

In some implementations, the data storage device may adjust the frequency for each data transfer between the memory and the controller. In other implementations, the data storage device may periodically or continually monitor the performance metric and adjust the frequency based on the performance metric. For example, the frequency may be adjusted based on a most recent value of the performance metric or based on a historical average value of the performance metric. Prior to a low voltage condition, the data storage device may transfer data between the controller and the memory at a first data transfer rate. Responsive to the low voltage condition, the data storage device may transfer data between the memory and the controller at a second data transfer rate (e.g., a reduced data transfer rate as compared to the first data transfer rate) to accommodate reduced performance speed, such as a reduced transistor switching speed caused by a low supply voltage condition. After the low voltage condition ends (e.g., after there is no longer a low voltage condition), the data storage device may transfer data between the memory and the controller at the first data transfer rate (e.g., an increased data transfer rate as compared to the second data transfer rate) to accommodate increased performance speed, such as an increased transistor switching speed. Accordingly, the data storage device may dynamically adjust the data transfer rate (e.g., by changing the frequency of the clock signal) to match the performance capability, such as the transistor switching speed, of the data storage device.

Figure 1:
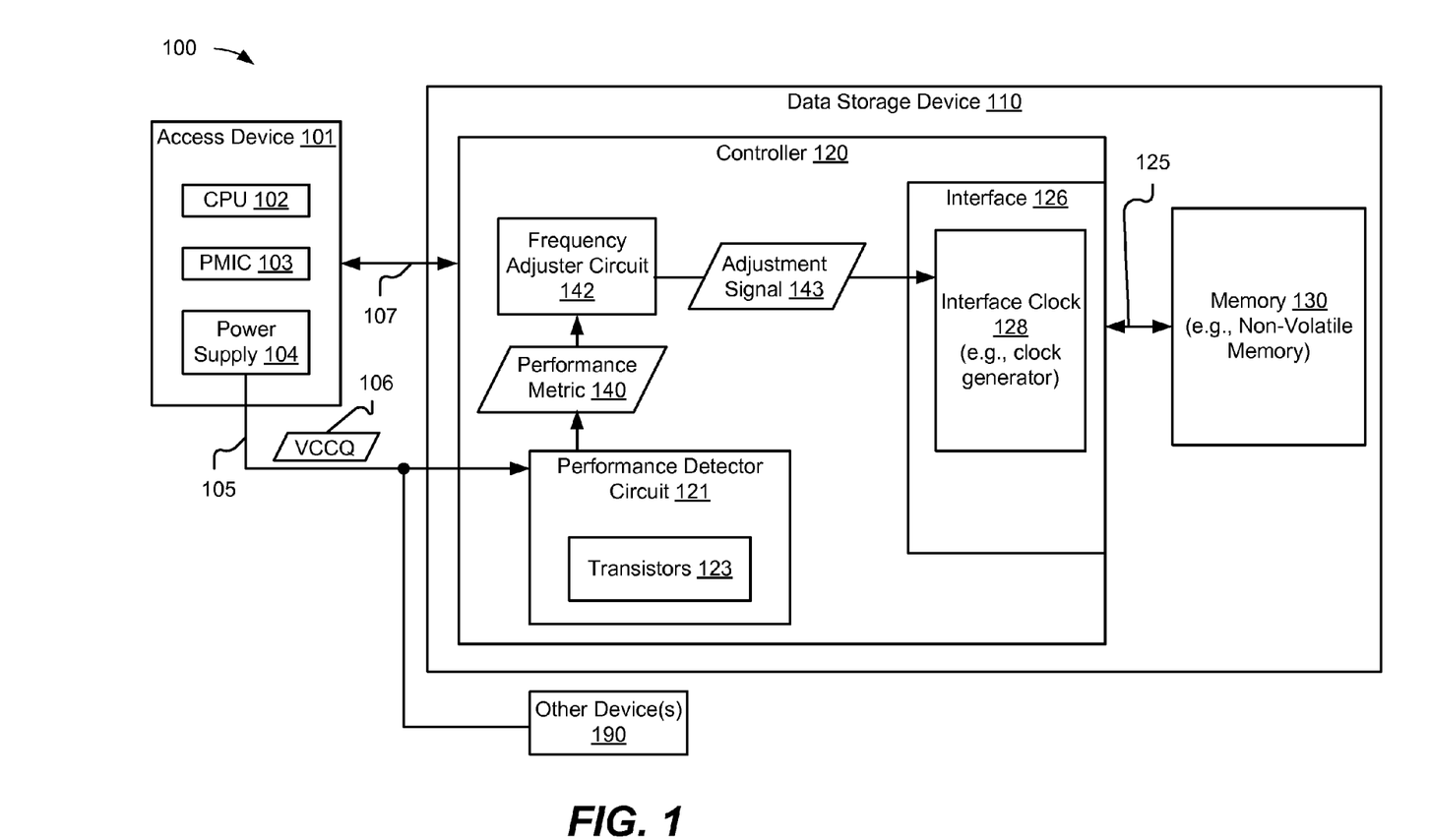
FIG. 1 is a block diagram of a particular illustrative example of a system including a data storage device configured to adjust an interface clock signal frequency.

FIG. 1 depicts an illustrative example of a system 100 that includes a data storage device 110 and an access device 101. The data storage device 110 includes a controller 120 (e.g., a memory controller) and a memory 130 that is coupled to the controller 120.

The access device 101 may include a central processing unit (CPU) 102, a power management integrated circuit (PMIC) 103, and a power supply 104. The CPU 102 may be configured to perform one or more functions that may be performed at the access device 101, such as a media playback function. For example, the CPU 102 may be configured to provide multimedia file playback using data retrieved from the data storage device 110.

The PMIC 103 may be configured to control one or more power supplies at the access device 101 and may further be configured to control one or more power supplies that are provided to one or more external devices coupled to the access device 101, such as the data storage device 110. For example, the PMIC 103 may be responsive to the CPU 102 and may be configured to control or adjust a voltage provided by the power supply 104 to the data storage device 110 and/or to another device(s) 190.

The power supply 104 may be responsive to the PMIC 103 and may be configured to provide one or more supply voltages to one or more devices coupled to the access device 101, such as the data storage device 110 and the other device(s) 190. For example, the power supply 104 may be coupled to the data storage device 110 via a first connection 105, such as a bus (or wire). The power supply 104 may be configured to provide a supply voltage ("VCCQ") 106 that may be used as a supply voltage to one or more components (e.g., the controller 120) of the data storage device 110. The supply voltage 106 provided by the power supply 104 on the first connection 105 may also be used by the other device(s) 190. Operation of one or more devices coupled to the first connection 105 may cause deviations in the supply voltage 106 on the first connection 105 from a nominal level, such as due to increased current consumption caused by processing at the other device(s) 190.

The access device 101 is coupled to the data storage device 110 via the first connection 105 and is further coupled to the data storage device 110 via a second connection (e.g., a first communication path 107), such as a bus or a wireless connection. The access device 101 may include a memory interface (not shown) and may be configured to communicate with the data storage device 110 via the memory interface to read data from and write data to the memory 130 of the data storage device 110. For example, the access device 101 may operate in compliance with a Joint Electron Devices Engineering Council (JEDEC) industry specification, such as a Universal Flash Storage (UFS) Access Controller Interface specification. As other example, the access device 101 may operate in compliance with one or more other specifications, such as a Secure Digital (SD) Access Controller specification, as an illustrative, non-limiting example. The access device 101 may communicate with the memory 130 in accordance with any other suitable communication protocol.

The data storage device 110 includes a controller 120 (e.g., a memory controller) and a memory 130 that is coupled to the controller 120. The controller 120 is configured to receive data and instructions from the access device 101 and to send data to the access device 101. For example, the controller 120 may send data to the access device 101 via the first communication path 107, and the controller 120 may receive data from the access device 101 via the first communication path 107. The controller 120 is configured to send data and commands to the memory 130 and to receive data from the memory 130. For example, the controller 120 is configured to send data and a write command to cause the memory 130 to store data to a storage element (corresponding to an address) of the memory 130. The write command may specify a physical address of a portion of the memory 130 (e.g., a physical address of a word line of the memory 130) that is to store the data. The controller 120 may also be configured to send data and commands to the memory 130 associated with background scanning operations, garbage collection operations, and/or wear leveling operations, etc., as illustrative, non-limiting examples. The controller 120 is configured to send a read command to the memory 130 to access data from a storage element (corresponding to a specified address) of the memory 130. The read command may specify the physical address of a portion of the memory 130 (e.g., a physical address of a word line of the memory 130).

The memory 130 of the data storage device 110 may include one or more memory dies (e.g., one memory die, two memory dies, eight memory dies, or another number of memory dies). In some implementations, the memory 130 includes a non-volatile memory of storage elements included in a memory die. For example, the memory 130 may include a flash memory, such as a NAND flash memory, or a resistive memory, such as a resistive random access memory (ReRAM), as illustrative, non-limiting examples. The memory 130 may have a three-dimensional (3D) memory configuration. As an example, the memory 130 may have a 3D vertical bit line (VBL) configuration. In a particular implementation, the memory 130 is a non-volatile memory having a 3D memory configuration that is monolithically formed in one or more physical levels of arrays of memory cells having an active area disposed above a silicon substrate. Alternatively, the memory 130 may have another configuration, such as a two-dimensional (2D) memory configuration or a non-monolithic 3D memory configuration (e.g., a stacked die 3D memory configuration).

The memory 130 may include one or more blocks of storage elements (e.g., also referred to herein as memory cells). For example, each of the blocks may include a NAND flash erase block. Each storage element of the memory 130 may be programmable to a state (e.g., a threshold voltage in a flash configuration or a resistive state in a resistive memory configuration) that indicates one or more values. Each block of the memory 130 may include one or more word lines. Each word line may include one or more pages, such as one or more physical pages. A word line may be configurable to operate as a single-level-cell (SLC) word line, as a multi-level-cell (MLC) word line, or as a tri-level-cell (TLC) word line, as illustrative, non-limiting examples.

The memory 130 may be coupled via a second communication path 125, such as a bus, to the controller 120. For example, the second communication path 125 may include one or more channels to enable the controller 120 to communicate with a single memory die of the memory 130. As another example, the second communication path 125 may include multiple distinct channels (e.g., multiple communication channels) to enable the controller 120 to communicate with each memory die of the memory 130 in parallel with, and independently of, communication with other memory dies of the memory 130. At least one communication channel of the multiple communication channels may be configured to provide a clock signal generated by an interface clock 128 from the controller 120 to the memory 130. The second communication path 125 may include a wired connection (e.g., a bus), a wireless connection, one or more interfaces, or a combination thereof. The second communication path 125 may be configured to operate at a nominal frequency to support data transfer operations between the controller 120 and the memory 130. For example, data transfer operations may occur between the controller 120 and the memory 130 at a data transfer rate based on a frequency of a clock signal, as described further herein.

The controller 120 includes an interface 126, a performance detector circuit 121, and a frequency adjuster circuit 142. The interface 126 may be configured to be communicatively coupled to the memory 130. The interface 126 (e.g., interface circuitry) may include the interface clock 128 and one or more additional components (not shown). The one or more additional components may include data bus connectors, an output driver, input/output (I/O) buffers and/or latches, or a combination thereof, as described with reference to FIG. 2. The interface clock 128, such as a clock generator, may be configured to generate a clock signal having a clock signal. Data may be transferred between the controller 120 and the memory 130 at a data transfer rate based on a frequency of the clock signal. For example, the interface 126 may be configured to output a data value to the second communication path 125 at a data transfer rate based on the clock signal to send data from the controller 120 to the memory 130. To illustrate, the interface 126 may output the data value to the second communication path 125 responsive to a rising edge of the clock signal generated by the interface clock 128. As another example, the interface may be configured to receive a data value from the memory 130 via the second communication path based on the clock signal. To illustrate, the interface 126 may store (e.g., latch) a data value received from the second communication path 125 responsive to a falling edge of the clock signal generated by the interface clock 128.

The performance detector circuit 121 is coupled to the first connection 105 and includes a plurality of transistors 123. The performance detector circuit 121 is configured to perform one or more measurement operations to determine a performance metric 140 of the data storage device 110. For example, the performance metric 140 may indicate electronic device performance at the controller 120, such as a switching speed of a transistor at the plurality of transistors 123. The performance of the electronic device (e.g., the switching speed of a transistor) may be affected by one or more factors, including a voltage level of the supply voltage 106, temperature, process variations (e.g., component spacing, conductor thickness, etc.) that may occur during fabrication of the controller 120, one or more other factors, or a combination thereof. To illustrate, when the supply voltage 106 falls below a nominal voltage level, such as due to operation of the other device(s) 190 or operations performed by components included in the controller 120, transistor switching speed at the controller 120 may decrease. As another example, as a temperature of the data storage device 110 increases, transistor switching speed at the controller 120 may decrease. As a result of a decrease in the supply voltage 106 and/or an increase in the temperature, operations that may be performed at the controller 120, such as data transfer operations between the controller 120 and the memory 130 via the second communication path 125, may be impaired by the reduced transistor switching speed.

As an illustrative example, the performance detector circuit 121 may determine a value of the performance metric based on the plurality of transistors 123, as described with reference to FIGS. 3-5. For example, the plurality of transistors 123 may be included in a chain circuit configured to receive a reference signal at an input of the chain circuit. The performance detector circuit 121 may determine the performance metric 140 based on how far a reference signal is able to propagate through at least a portion of the chain circuit during a time period. To illustrate, the farther the reference signal propagates through the chain circuit during the time period, the higher the performance of the electronic device (e.g., the higher the switching speed of a transistor). The performance detector circuit 121 may provide a value of the performance metric 140 to the frequency adjuster circuit 142.

In some implementations, the performance metric 140 generated by the performance detector circuit 121 may be an estimate of a "momentary reliability" of the supply voltage 106 that is determined in response to detecting one or more accesses of the data storage device 110 by the access device 101. Additionally or alternatively, the performance metric 140 may be determined periodically (e.g., after regular intervals) or at times according to a schedule. To illustrate, an updated value of the performance metric 140 may be determined for each request received from the access device 101 (e.g., the updated value of the performance metric is determined on a request-by-request basis). The value of the performance metric 140 may indicate a speed of the electronic device. For example, the value of the performance metric 140 may be a binary value that indicates a relative speed of the electronic device. To illustrate, a value of logical zero may indicate a relatively "slow" speed and a value of logical one may indicate a relatively "fast" speed. As another example, the value of the performance metric 140 may include a multibit number that represents a relative speed of the electronic device.

The frequency adjuster circuit 142 is coupled to the performance detector circuit 121 and to the interface clock 128. The frequency adjuster circuit 142 is configured to output an adjustment signal 143 that indicates to increase or decrease the frequency of the interface clock 128.

The second communication path 125 may be configured to operate at a nominal frequency to support data transfer operations between the controller 120 and the memory 130. However, in response to detecting, based on the performance metric 140 generated by the performance detector circuit 121, that a device performance speed has decreased to below a threshold, the controller 120 may reduce a clock frequency of the clock signal generated by the interface clock 128 to accommodate the reduced performance speed of devices at the controller 120 and the memory 130. For example, the controller 120 may reduce a frequency of a clock signal generated by the interface clock 128. By measuring the device performance speed at the performance detector circuit 121, the controller 120 may adjust a timing of operations to be performed at the data storage device 110, such as a clock frequency of the clock signal generated by the interface clock 128.

During operation, the access device 101 may provide the supply voltage 106 to the data storage device 110 via the first connection 105. In addition, the other device(s) 190 may also receive the supply voltage 106 via the first connection 105. Operations performed at the other device(s) 190 may cause the supply voltage 106 to vary in voltage level in a manner that is not controllable or predictable by the data storage device 110. The access device 101 may send a memory access request to the data storage device 110, such as a request to read data from the memory 130 or to write data to the memory 130.

In response to receiving the memory access request, the controller 120 may query the performance detector circuit 121 to determine the performance metric 140. For example, as described in further detail with respect to FIG. 3, the performance detector circuit 121 may be configured to perform a measurement to determine a value of the performance metric 140 that is indicative of a switching speed of one or more transistors included in the data storage device 110. In response to determining the performance metric 140 at the performance detector circuit 121, the controller 120 may adjust the frequency of the interface clock 128. For example, the controller 120 may select a particular frequency that provides an available data throughput of the second communication path 125 based on the particular performance metric that is received via the performance detector circuit 121.

After setting (e.g., adjusting) the frequency of the interface clock 128, the controller 120 may initiate data transfer between the controller 120 and the memory 130 via the second communication path 125, such as by providing write data received from the access device 101 to the memory 130 for storage or retrieving read data requested by the access device 101 from the memory 130. Results of the memory access operation may be provided from the data storage device 110 to the access device 101, such as requested data read from the memory 130 in the case of a data read operation or one or more acknowledgement signals indicating performance of a data write operation in the case of a data write operation. The response to the memory access operation may be provided from the data storage device 110 to the access device 101 via the first communication path 107.

After completing the first memory access request, or during processing of the first memory access request, the access device 101 may send a second memory access request to the data storage device 110. Prior to performing the second memory access request, an updated value of the performance metric 140 may be generated by the performance detector circuit 121 and may be evaluated by the controller 120 to determine a next frequency of the interface clock 128 to be used during performance of the second memory access operation.

In some implementations, the interface clock 128, the performance detector circuit 121, the frequency adjuster circuit 142, or a combination thereof, may be included in the memory 130. For example, each of the interface clock 128, the performance detector circuit 121, and the frequency adjuster circuit 142 may be included in the memory 130. If the interface clock 128 is included in the memory 130, a clock signal generated by the interface clock 128 may be provided from the memory 130 to the controller 126 via at least one channel of the second communication path 125. As another example, one of the interface clock 128, the performance detector circuit 121, or the frequency adjuster circuit 142 may be included in the memory 130 and another of the interface clock 128, the performance detector circuit 121, or the frequency adjuster circuit 142 may be included in the controller 120. In this example, the performance metric 140, the adjustment signal 142, and/or the clock signal generated by the interface clock 128 may be communicated via the second communication path 125. To illustrate, if the performance detector circuit 121 is included in the controller 120 and the frequency adjuster circuit 142 is included in the memory 130, the performance metric 140 may be communicated from the controller 120 to the memory 130 via the second communication path 125.

Thus, the performance detector circuit 121 enables the controller 120 to dynamically determine an appropriate frequency of the interface clock 128 based on one or more factors, such as responsive to changes in the supply voltage 106, changes in temperature, or one more factors that may affect device performance speed in the controller 120. Compared to a duration of a data transfer operation (corresponding to a data read operation or a data write operation) via the second communication path 125, a change in the value of the performance metric 140 that results in adjustment of the frequency of the internal clock 128 may occur relatively slowly. Because the change in the value of the performance metric 140 occurs relatively slowly, measurement of the performance metric 140 and determination of the frequency of the interface clock 128 prior to initiating the memory operation may provide a sufficient margin of error to enable completion of the memory operation.

In some implementations, the data storage device 110 may be embedded within the access device 101, such as in accordance with a Joint Electron Devices Engineering Council (JEDEC) Solid State Technology Association Universal Flash Storage (UFS) configuration. For example, the data storage device 110 may be configured to be coupled to the access device 101 as embedded memory, such as eMMC® (trademark of JEDEC Solid State Technology Association, Arlington, Virginia) and eSD, as illustrative examples. To illustrate, the data storage device 110 may correspond to an eMMC (embedded MultiMedia Card) device. As another example, the data storage device 110 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). Alternatively, the data storage device 110 may be removable from the access device 101 (i.e., "removably" coupled to the access device 101). As an example, the data storage device 110 may be removably coupled to the access device 101 in accordance with a removable universal serial bus (USB) configuration.

In some implementations, the data storage device 110 may include or correspond to a solid state drive (SSD) which may be included in, or distinct from (and accessible to), the access device 101. For example, the data storage device 110 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 110 is coupled to the access device 101 indirectly, e.g., via a network. For example, the network may include a data center storage system network, an enterprise storage system network, a storage area network, a cloud storage network, a local area network (LAN), a wide area network (WAN), the Internet, and/or another network. In some implementations, the data storage device 110 may be a network-attached storage (NAS) device or a component (e.g., a solid-state drive (SSD) device) of a data center storage system, an enterprise storage system, or a storage area network.

The data storage device 110 may operate in compliance with a JEDEC industry specification. For example, the data storage device 110 may operate in compliance with a JEDEC eMMC specification, a JEDEC Universal Flash Storage (UFS) specification, one or more other specifications, or a combination thereof. In some implementations, the data storage device 110 and the access device 101 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples.

In some implementations, the memory 130 may include support circuitry, such as read/write (R/W) circuitry, to support operation of the memory 130, such as operation of one or more memory dies of the memory 130. The read/write circuitry may be a single component or may be divided into separate components of the memory 130, such as read circuitry and write circuitry. The read/write circuitry may be external to the one or more dies of the memory 130. Alternatively, one or more individual memory dies of the memory 130 may include corresponding read/write circuitry that is operable to read data from and/or write data to storage elements within the individual memory die independent of any other read and/or write operations at any of the other memory dies.

By adjusting the frequency of the interface clock 128 based on the performance metric 140, the data storage device 110 may determine an appropriate frequency of the interface clock 128. Accordingly, the data storage device 110 may dynamically adjust a data transfer rate (e.g., the frequency of the interface clock 128) to match a performance speed, such as the transistor switching speed, of the data storage device 110.

Figure 2:
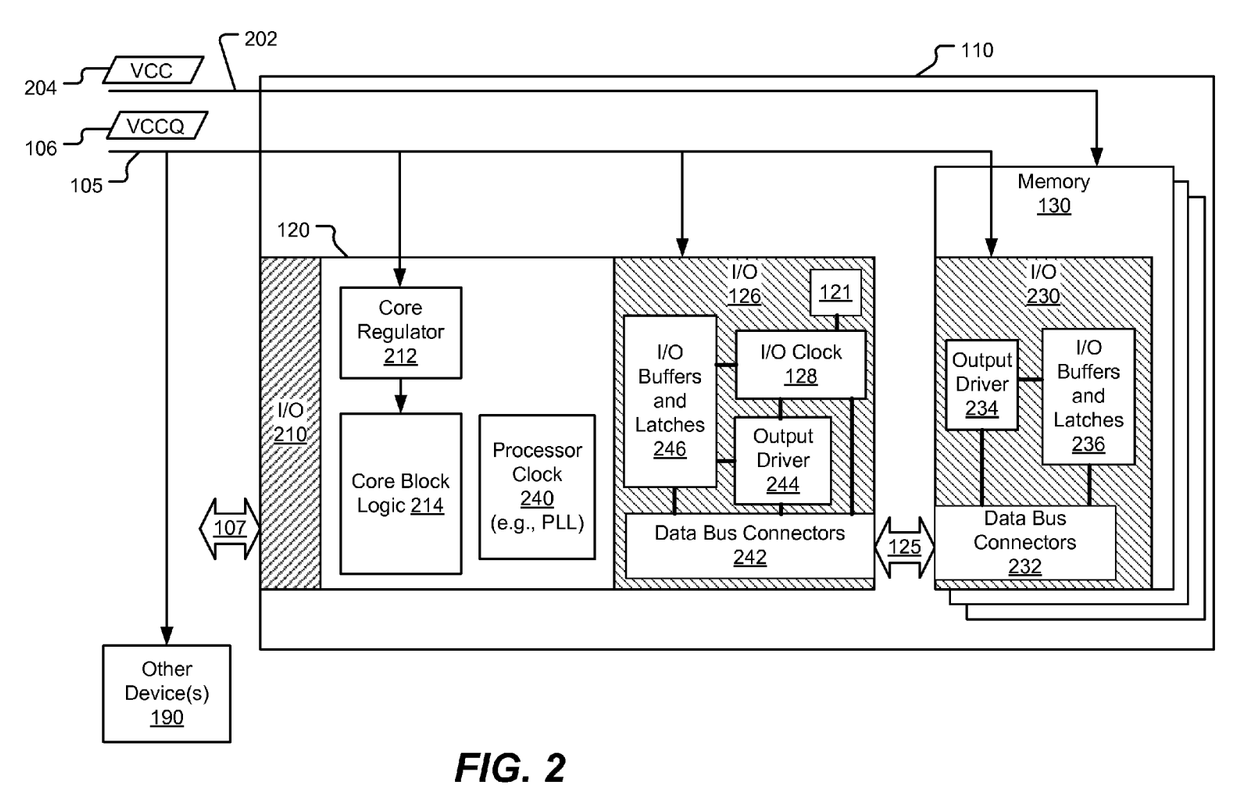
FIG. 2 is a block diagram of a particular illustrative example of components that may be included in the data storage device of FIG. 1.

FIG. 2 illustrates an example of components that may be included in the data storage device 110 of FIG. 1. As illustrated in FIG. 2, the data storage device 110 includes the controller 120 coupled to the memory 130 via the second communication path 125. The memory 130 includes a second interface 230 that is configured to provide an interface between the second communication path 125 and one or more memory dies of the memory 130.

The memory 130 is configured to receive a second supply voltage (VCC) 204 via a fourth connection 202. The memory 130 is further configured to receive the supply voltage (VCCQ) 106 via the first connection 105. The second interface 230 is configured to operate using the supply voltage (VCCQ) 106 as a power supply.

The second interface 230 (e.g., interface circuitry) may include data bus connectors 232, an output driver 234 coupled to the data bus connectors 232, and input/output (I/O) buffers and latches 236. The I/O buffers and latches 236 may be configured to store or to latch data that is received via the data bus connectors 332 or data that is to be written to the second communication path 125 (e.g., a data bus) via the data bus connectors 232. The data bus connectors 232 may include physical electrical connectors that couple the second interface 230 to the second communication path 125. The output driver 234 may include dedicated circuitry and electrical connections to enable the second interface 230 to drive electrical signals over the second communication path 125 (e.g., a data bus).

The controller 120 includes a third interface 210 that is coupled to the first communication path 107 and configured to enable communications via the first communication path 107. In some implementations, the third interface 210 (e.g., an interface circuit) may include a power supply input configured to receive the supply voltage 106 from the access device 101. The power supply input of the third interface 210 may be coupled to one or more components of the data storage device 110, such as the interface 126 and the performance detector circuit 121.

The controller 120 includes a core regulator 212 that is configured to provide a regulated voltage to core block logic 214. For example, the core block logic 214 may include circuitry, such as one or more processing units of a general purpose processor, one or more dedicated circuits, such as error correction coding circuitry, or a combination thereof. The core regulator 212 may be configured to generate a supply voltage to the core block logic 214 that is relatively free of variation and transients that may be experienced on the first connection 105.

The controller 120 further includes the interface 126 (e.g., interface circuitry). The interface 126 includes circuitry configured to enable communication via the second communication path 125 with the memory 130. The interface 126 is configured to receive the supply voltage (VCCQ) 106 via the first connection 105.

The interface 126 may include the performance detector circuit 121, the interface clock 128, data bus connectors 242, an output driver 244, and input/output buffers and latches 146. The data bus connectors 242 may include electrical connectors to enable electrical signal propagation via the second communication path 125. The I/O buffers and latches 246 may be configured to store data that is received via the core block logic 214 to be transmitted via the second communication path 125 using electrical signals at the data bus connectors 242 that are generated by the output driver 244. In addition, or alternatively, the I/O buffers and latches 246 may store data values represented by electrical signals received at the data bus connectors 242 via the second communication path 125, such as signals generated by the second interface 230 of the memory 130.

The performance detector circuit 121 is configured to monitor device (e.g., transistor) performance that may be directly related to I/O performance of the interface 126 and the second communication path 125. The performance detector circuit 121 may therefore be placed in close physical proximity to the interface 126 on the controller 120 or may be included as a separate module within the interface 126. As depicted in FIG. 2, the performance detector circuit 121 may be implemented within the interface 126. For example, the performance detector circuit 121 may be located proximate (e.g., physically close) to a connector or a pin that couples the first connection 105 to the interface 126. In other implementations, the performance detector circuit 121 may be located proximate to a connector or pin that couples the interface 126 to the second communication path 125. For example, the performance detector circuit 121 may be located proximate to the data bus connectors 242. The performance detector circuit 121 may be configured to receive a reference signal and a clock signal, as described further herein with reference to FIGS. 3-5, and to provide one or more interrupt signals or other signals, such as the performance metric 140, to control circuitry in the controller 120.

The controller 120 may include one or more clock signals that may be provided to the performance detector circuit 121 for determination of the performance metric 140. For example, the controller 120 may include a processor clock 240 configured to generate a clock signal that may be used to control timing of one or more operations performed at the controller 120, such as timing associated with instruction execution at a processing device within the core block logic 214. The clock signal generated by the processor clock 240 may have a relatively high reliability and relatively low variation. For example, the processor clock 240 may include a phase-lock-loop (PLL) clock generation circuitry. Alternatively, or in addition, the performance detector circuit 121 may be responsive to a clock signal output by an interface clock 128. For example, the interface clock 128 may have relatively lower reliability as compared to a clock signal generated by the processor clock 240. The clock signal generated by the interface clock 128 may be used by the interface 126 to control data transfers via the second communication path 125. If the clock signal output by the interface clock 128 is used as reference by the performance detector circuit 121, the performance determined (e.g., monitored) by the performance may be in direct relation to the clock signal generated by the interface clock 128 (e.g., the performance detector circuit 121 may estimate performance of interface 126 based on using the clock signal output by the interface clock 128).

In some implementations, the controller 120 may include or may be coupled to a particular memory (not shown), such as a non-volatile memory, a random access memory (RAM), or a read only memory (ROM), that is distinct from the memory 130. The particular memory may be configured to store one or more values of the performance metric 140 of FIG. 1. The particular memory may be a single memory component, multiple distinct memory components, and/or may include multiple different types (e.g., volatile memory and/or non-volatile) of memory components. In some implementations, the other memory may be included in the access device 101 of FIG. 1. The particular memory may be accessible to the frequency adjuster circuit 142 and/or to the core block logic 214.

In a particular implementation, the interface 126 may include the frequency adjuster circuit 142. The frequency adjuster circuit 142 may be configured to generate the adjustment signal 143 that is provided to the interface clock 128. For example, the frequency adjuster circuit 142 may generate the adjustment signal 143 based on a most recent value of the performance metric 140 generated by the performance detector circuit 121. As another example, the frequency adjuster circuit 142 may generate the adjustment signal 143 as a historical average value of the performance metric 140. To illustrate, the historical average may be an average of the ten most recent values of the performance metric 140 or of one or more values of the performance metric 140 determined during a time period (e.g., the last 30 seconds).

Although FIG. 2 illustrates a performance detector circuit 121 in the interface 126 of the controller 120, in other implementations, the performance detector circuit 121 may alternatively or additionally be implemented at the memory 130, such as in the second interface 230. Additionally or alternatively, the interface clock 128 may be included in the interface 126 or in the memory 130. Regardless of the location of the interface clock 128, a clock signal generated by the interface clock 128 may be provided to the second communication path 125 so that both the interface 126 and the second interface 230 receive the clock signal.

Figure 3:
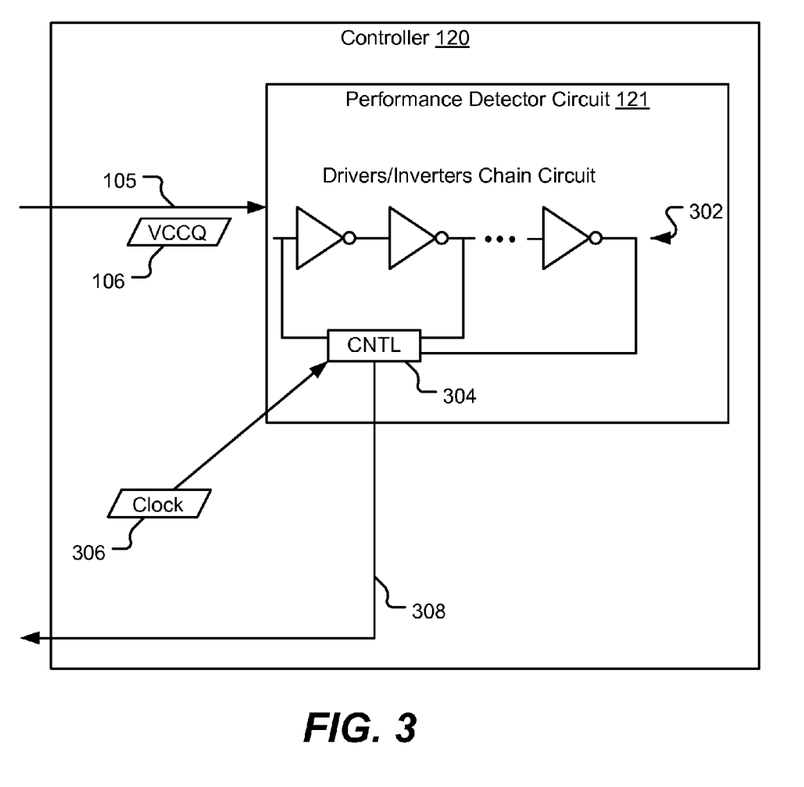
FIG. 3 is a block diagram of a particular illustrative example of components that may be included in the controller of FIG. 1.

FIG. 3 depicts an illustrative system showing components that may be included in the performance detector circuit 121 of FIG. 1. The performance detector circuit 121 is illustrated within the controller 120 and includes a chain circuit 302 coupled to a control circuit 304. The chain circuit 302 may include multiple serially coupled electronic devices, such as drivers (e.g., non-inverting buffers), inverters, or a combination thereof, as described further with reference to FIG. 4. In some implementations, the chain circuit 302 may include the plurality of transistors 123 of FIG. 1.

The control circuit 304 may be coupled to the chain circuit 302 and may be configured to initiate a state of the chain circuit 302 prior to performance of a device performance measurement. The control circuit 304 may also be configured to initiate an operation that includes propagation of a signal (e.g., a reference signal) through the chain circuit 302 and to detect a result of signal propagation along the chain circuit 302 during an indicated time period. The time period may be associated with a period of a clock signal, as described with reference to FIG. 5. For example, in a particular implementation, the time period corresponds to a duration of time between a rising edge of the clock signal 306 and a falling edge of the clock signal 306. To illustrate, the control circuit 304 may be configured to initiate the propagation of the signal (through the chain circuit 302) that begins on a rising edge of a received clock signal 306, such as from the interface clock 128 of FIG. 1 or the processor clock 240 of FIG. 2. The control circuit 304 may be configured to terminate measurement or propagation of the signal in the chain circuit 302 in response to a falling edge of the received clock signal 306. By detecting how far the signal propagates through the chain circuit 302 during a time period that occurs between the rising edge and the falling edge of the received clock signal 306, the control circuit 304 may generate an output signal 308 that is provided to the frequency adjuster circuit 142 of FIG. 1. For example, the output signal 308 may be associated with the performance metric 140 of FIG. 1 and may indicate an operating speed of an electronic device.

In some implementations, the performance detector circuit 121 (e.g., the chain circuit 302) may include a daisy chain of electronic devices (e.g., inverters and/or drivers) that may be triggered and evaluated by the control circuit 304. The daisy chain of electronic devices may enable signal propagation at a propagation speed that may depend on the voltage level of the supply voltage 106, the temperature, one or more structure characteristics of the performance detector circuit 121, or one or more other factors. The control circuit 304 may reset and trigger the daisy chain of electronic devices (e.g., the chain circuit 302) to define a time window for measuring how many of the devices in the chain circuit 302 have switched states. The number of devices in the chain circuit 302 that have switched states (N_inv) within the time window may indicate a reliability or a "silicon speed."

The control circuit 304 may be configured to compare the number of devices that have switched states to a threshold number of devices to determine whether to reduce a frequency of the interface clock 128. For example, the threshold may correspond to be fifty devices of the chain circuit 302 receiving the propagated signal during a time period to indicate that data transfer may be performed using a nominal frequency of the interface clock 128 (e.g., performed at a nominal speed at the second communication path 125). However, in response to determining that the signal is not propagated through the threshold number (e.g., at least fifty devices in the chain circuit 302), the control circuit 304 may generate the output signal 308 indicating that device performance is not sufficiently fast to enable nominal operation of the second communication path 125 and that the frequency of the interface clock 128 should be set to less than the nominal frequency.

Similarly, a second threshold may be used to determine whether a device performance of the chain circuit 302 is sufficiently fast to enable an increase of the frequency of the interface clock 128. The control circuit 304 may be configured to detect that a signal propagation through the chain circuit 302 has exceeded a number of devices corresponding to the second threshold, and the control circuit 304 may indicate via the output signal 308 that the frequency of the interface clock 128 may be increased. By determining whether to adjust the frequency at the interface clock 128 based on signal propagation speed along the chain circuit 302, the performance detector circuit 121 may enable an "optimal" frequency of the interface clock 128 to be determined dynamically, such as in response to each memory access operation to be performed between the controller 120 and the memory 130.

Figure 4:
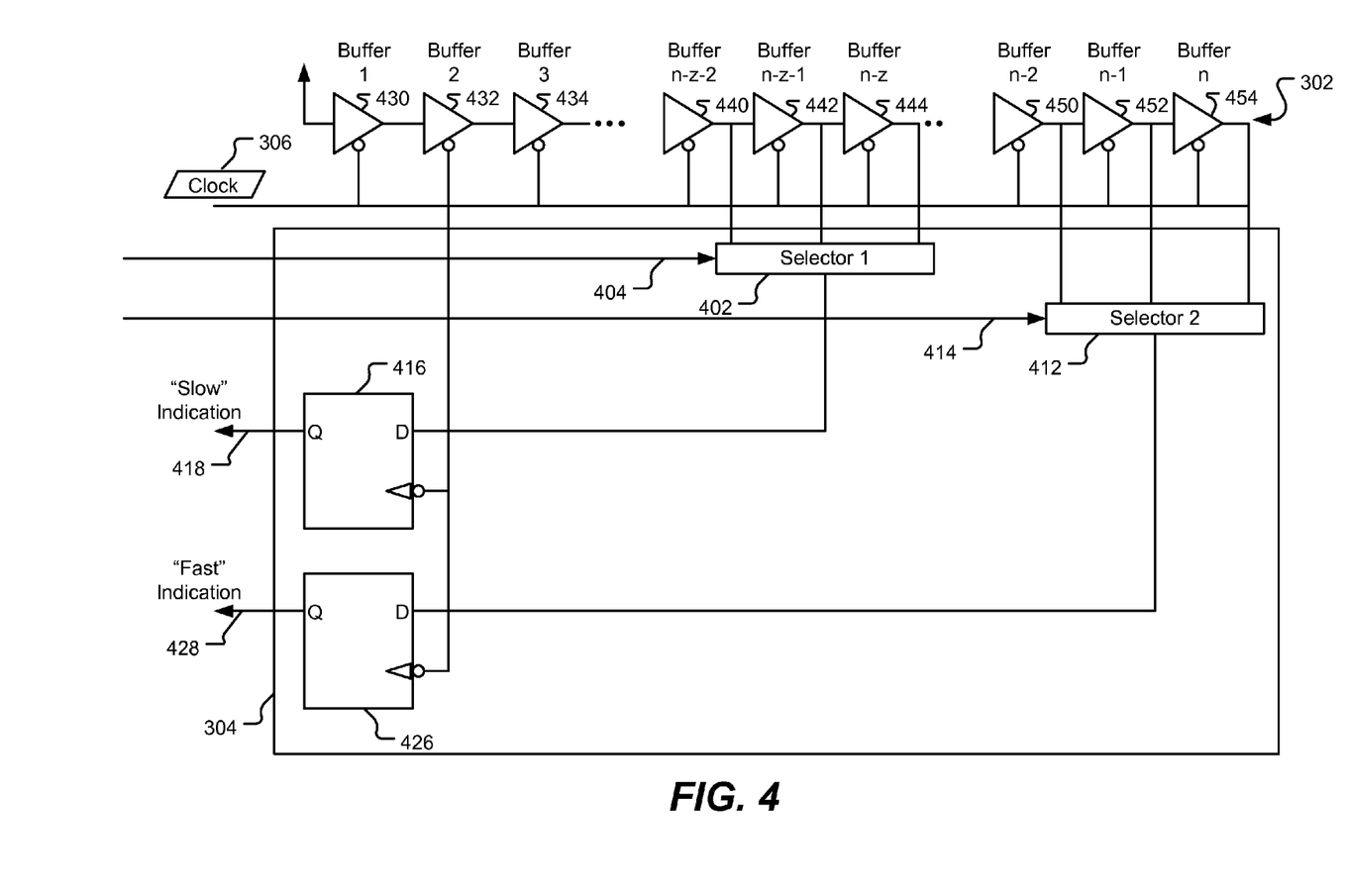
FIG. 4 is a block diagram of a particular illustrative example of components that may be included in the performance detector circuit of FIG. 1.

FIG. 4 illustrates a particular implementation of the performance detector circuit 121 of FIG. 3. The chain circuit 302 is illustrated as including multiple buffers, such as an initial buffer 430 (buffer 1) of the chain circuit 302. The initial buffer 430 is coupled to receive an input signal (e.g., a reference signal) tied to a particular logical level (e.g., a logic 1 level) at an input and has an output coupled to an input of a second buffer (buffer 2) 432. Each successive buffer has an input coupled to an output of the previous buffer in the buffer order along the chain circuit 302. The chain circuit 302 is illustrated as including "N" buffers, where N may be any positive integer greater than 1. For example, N may be forty, sixty, one hundred, or any other number of buffers. Each buffer of the chain circuit 302 is configured to receive, at an enable input, the received clock signal 306. When the received clock signal 306 has a logical high voltage, the buffers of the chain circuit 302 may be configured to generate a logical low voltage at an output independent of a value at the input of the buffer. When the received clock signal 306 has a logical high value, each of the buffers of the chain circuit 302 may be configured to output a logical value corresponding to a logical value received at the input of the buffer.

The control circuit 304 is illustrated as including a first selector (selector 1) 402, a second selector (selector 2) 412, a first latch circuit 416, and a second latch circuit 426. The first selector 402 is coupled to multiple devices (e.g., a first portion) of the chain circuit 302. For example, the first selector 402 is illustrated as being coupled to an output of a buffer 440, an output of a buffer 442, and an output of a buffer 444. The first selector 402 may be configured to be responsive to a value at an input 404 (e.g., a control signal) to select between one of the three inputs of the first selector 402 that is coupled to the buffers 440-444 and to provide the signal at the selected one of the inputs as an output of the first selector 402. For example, the first selector 402 may include a multiplexer responsive to the input 404. Although the each of the first selector 402 and the second selector 412 are described (and illustrated) as being coupled to three buffers, in other implementations, each of the first selector 402 and the second selector 412 may be coupled to fewer than or more than three buffers. Additionally or alternatively, the first selector 402 and the second selector 412 may be coupled to the same number or a different number of buffers.

The second selector 412 is coupled to multiple devices (e.g., a second portion) of the chain circuit 302. For example, the second selector 412 is illustrated as being coupled to an output of a buffer 450, an output of a buffer 452, and an output of a buffer 454. The second selector 412 may be configured to be responsive to a value at an input 414 (e.g., a control signal) to select between one of the three inputs of the second selector 412 that is coupled to the buffers 450-454 and to provide the signal at the selected one of the inputs as an output of the second selector 412. For example, the second selector 412 may include a multiplexer responsive to the input 414.

The first latch circuit 416 has an input coupled to the output of the first selector 402 and is configured to latch a value at an output 418 responsive to the received clock signal 306 at a clock input of the first latch circuit 416. The second latch circuit 426 has an input coupled to the output of the second selector 412 and is configured to latch a value at an output 428 responsive to the received clock signal 306 at a clock input of the second latch circuit 426.

The first selector 402 may be positioned to evaluate a signal from one of the buffers 440-444 to determine whether a signal has propagated the selected one of the buffers 440-444. The output of the first selector 402 is latched at the first latch circuit 416 and provided via the output 418, may indicate that performance of the devices of the chain circuit 302 is too slow as compared to the frequency of the received clock signal 306 and that the frequency of the received clock signal 306 may be reduced for data transfer operations at the second communication path 125. Selection of one of the buffers 440-444 may be performed or may be determined during testing and may be set, such as via one or more fuse connections, or may be determined and dynamically set by the controller 120.

The second selector 412 may be positioned to evaluate a signal from one of the buffers 450-454 to determine whether a signal has propagated the selected one of the buffers 450-454. The output of the second selector 412 is latched at the second latch circuit 426 and provided via the output 428, may indicate that performance of the devices of the chain circuit 302 is fast as compared to the frequency of the received clock signal 306 and that the frequency of the received clock signal 306 may be increased for data transfer operations at the second communication path 125. Selection of one of the buffers 450-454 may be performed or may be determined during testing and may be set, such as via one or more fuse connections, or may be determined and dynamically set by the controller 120.

Figure 5:
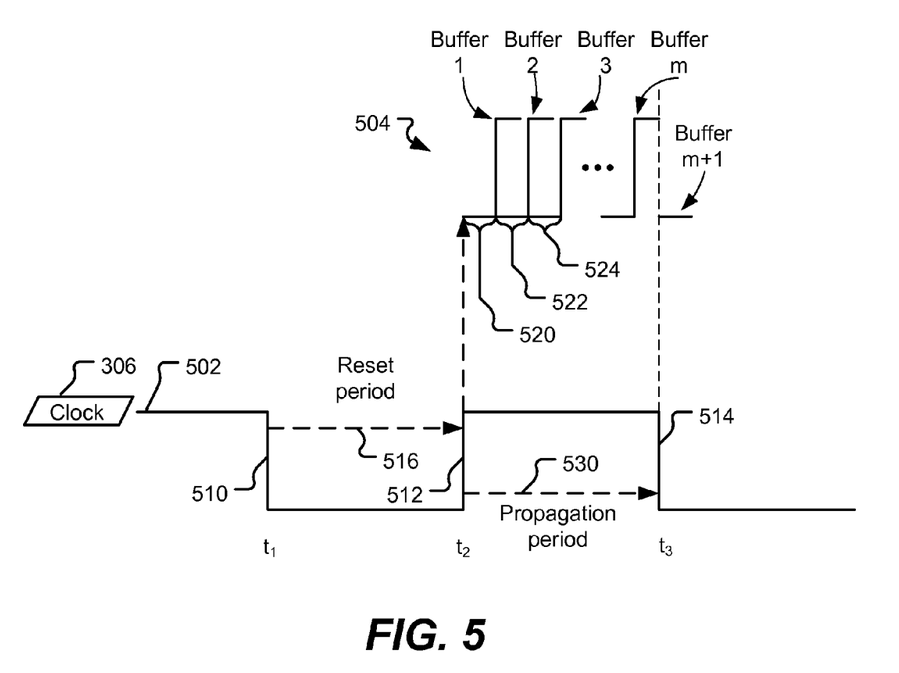
FIG. 5 is a timing diagram to illustrate an example of operation of the performance detector circuit of FIG. 1.

Referring to FIG. 5, a timing diagram is depicted illustrating a clock signal 502 corresponding to the clock signal 306 and showing a plurality of traces 504 corresponding to an output transition of each of the buffers of the chain circuit 302 as a function of time. At a first time t1, a falling edge 510 of the clock signal 502 causes a reset of the devices in the chain circuit 302 to be performed (e.g., during a reset period 516) and may cause an output of the first latch circuit 416 and the second latch circuit 426 of FIG. 4 to provide values of a measurement operation.

At time t2, in response to a rising edge 512 of the clock signal 502, a propagation period 530 of the chain circuit 302 begins. For example, the enable signal provided to each of the buffers of the chain circuit 302 enables outputs of each of the devices at the chain circuit 302 to be responsive to the input. After a first delay period 520, an output of the initial buffer 430 (buffer 1) transitions from 0 to 1, indicating a signal propagation delay of the initial buffer 430. After a second propagation delay period 522, the second buffer 432 in the chain circuit 302 transitions an output from a low value to a high value. After a third signal propagation delay 524, the third buffer 434 in the chain circuit 302 transitions from the low value to the high value. Transition of buffers from the low initial value to the high value continues until a falling edge 514 of the 502 at a time t3 occurs. At time t3, a buffer m, where m is a positive integer, has transitioned to the logical high output value, but a next buffer in the chain circuit 302 (buffer m+1) has remained at the logical low output value.

A determination of whether buffer m exceeds the selected buffer of the first selector 402 and/or exceeds the selected buffer of the second selector 412 of FIG. 4 may be determined by the control circuit 304, and a resulting output signal may be provided as the performance metric 140 to the frequency adjuster circuit 142 of FIG. 1. Increasing the frequency of the clock signal 502 results in a shorter propagation period 530, reducing the number of buffers that transition to the high output level between t2 and t3. Similarly, decreasing the frequency of the clock signal 502 increases the length of the propagation period 530 between t2 and t3 (e.g., a duration of time between a rising edge of the clock signal 502 and a falling edge of the clock signal 502), enabling a greater number of buffers to transition from the low output to the high output.

In some implementations, the output 418 and the output 428 of FIG. 4 may be processed by the frequency adjuster circuit 142 to generate the adjustment signal 143 of FIG. 1. When the processor clock 240 is used as the received clock signal 306, then the frequency adjuster circuit 142 may use a first high frequency of the interface clock 128 when the output 418 or the output 428 both have a 1 value. If the output 418 has a 1 value and the output 428 have a 0 value, then a slower frequency of the interface clock 128 may be used. If the first latch circuit 416 and the output 428 have a 0 value, then an even lower frequency of the interface clock 128 may be selected, or communication via the second communication path 125 may be halted until performance has increased and at least the output 418 has attained the 1 value.

In an implementation where the interface clock 128 is used as the received clock signal 306 and where the output 418 and the output 428 have a 1 value, a faster frequency of the interface clock 128 may be selected. If the output 418 has a 1 value and the output 428 has a 0 value, then no change in the frequency of the interface clock 128 may be selected (e.g., the frequency may be maintained). If the output 418 and the output 428 have a 0 value, a frequency of the interface clock 128 may be reduced or communication via the second communication path 125 may be halted until the output 418 is detected as having a 1 value.

A change in the supply voltage 106 or a change in temperature may be relatively slow as compared to data transfer operations along the second communication path 125. Accordingly, the feedback (e.g., the performance metric 140) may be determined quickly enough for each memory access operation for the memory access operation to be completed prior to voltage drop exceeding minimum safe voltage as the memory access operation is ongoing. Detection of changes in performance (e.g., performance speed) may be determined within the data storage device 110 and independently of any control signals or feedback to or from the access device 101. Thus, no modification to existing implementations of the first connection 105 or the supply voltage 106 of FIG. 1 are needed to implement the performance detector circuit 121.

Figure 6:
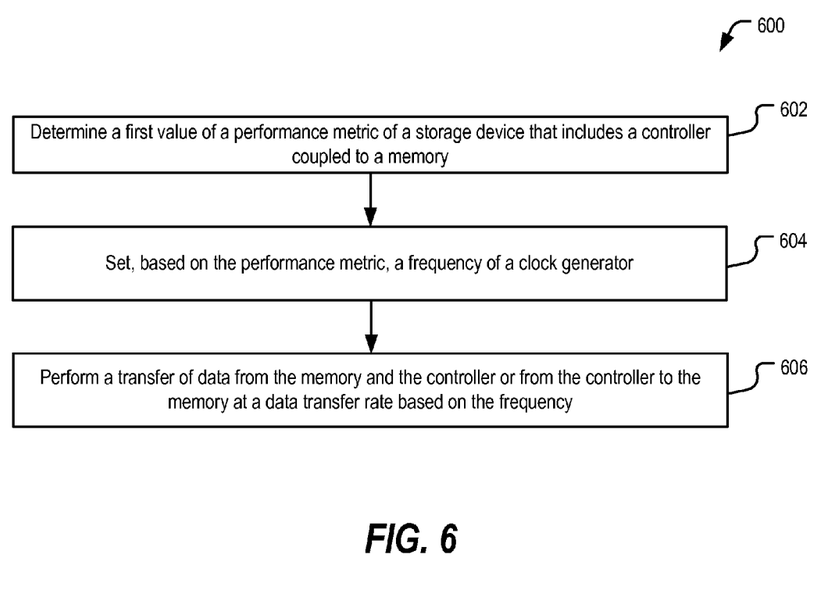
FIG. 6 is a flowchart of a particular illustrative example of a method of setting a frequency of a clock generator that may be performed by the data storage device of FIG. 1.

Referring to FIG. 6, a particular illustrative example of a method of setting a frequency of a clock generator is depicted and generally designated 600. The method 600 may be performed at the data storage device 110, such as performed by the controller 120, or the access device 101 of FIG. 1, or a combination thereof, as illustrative, non-limiting examples. To illustrate, the method 600 may be performed by the performance detector circuit 121, the frequency adjuster circuit 142, or a combination thereof.

The method 600 may include determining a first value of a performance metric of a storage device that includes a controller coupled to a memory, at 602. For example, the performance metric may include or correspond to the performance metric 140 of FIG. 1, the output signal 308 of FIG. 3, the output 418, or the output 428 of FIG. 4. The controller and the memory may include or correspond to the controller 120 and the memory 130, respectively, of FIG. 1. The controller may be coupled to the memory via a communication path, such as the second communication path 125 of FIG. 1.

The method 600 may also include setting, based on the first value of the performance metric, a frequency of a clock generator, at 604. The clock generator may include or correspond to the interface clock 128 of FIG. 1. The method 600 may further include performing a transfer of data form the memory to the controller or from the controller to the memory at a data transfer rate based on the frequency, at 606.

In some implementations, a power supply may be received at the storage device from an access device coupled to the storage device. For example, referring to FIG. 1, the data storage device 110 is configured to receive the supply voltage 106 from the access device 101. During operation of the storage device, a change in the power supply from a first value to a second value may be due at least in part to a current draw of another device coupled to the power supply. The second value may be less than the first value. Alternatively, the second value may be greater than the first value. The other device may include or correspond to the other device 190 of FIG. 1.

In some implementations, the controller may receive a first memory access request (e.g., a memory access command) at the controller from the access device. In response to receiving the first memory access request the controller may determine the first value of the performance metric. After completing the data transfer, the controller may receive a second memory access request. In response to receiving the second memory access request, the controller may determine a second value of the performance metric indicative of an operating speed of the storage device. The method 600 may include comparing the second value of the performance metric to a threshold. The frequency of the clock generator may be reduced in response to the second value of the performance metric being less than or equal to the threshold. Alternatively, the frequency of the clock generator may be maintained (e.g., not changed) if the second value is greater than the threshold. Additionally or alternatively, the second value may be compared to a second threshold. If the second value is greater than or equal to the second threshold, the frequency of the clock generator may be increased.

In some implementations, after completing the data transfer, the controller may determine a second value of the performance metric. The controller may determine whether to adjust the frequency of the clock generator based on a comparison between the first value and the second value. For example, the frequency may be increased in response to determining that the first value is exceeded by the second value. Alternatively, the frequency may be reduced in response to determining that the first value exceeds the second value. In some implementations, if an existing value of the frequency corresponds to a minimum frequency and if the first value exceeds the second value, the controller may delay initiation of a second data transfer to transfer second data from the memory to the controller or from the controller to the memory. The controller may determine a third value of the performance metric and compare the third value to the first value. In response to determining that the third value exceeds or is equal to the first value, the controller may initiate the second data transfer.

The method 600 may enable dynamic adjusting of a frequency of a clock generator, such as the interface clock 128 of FIG. 1. By dynamically adjusting the frequency of the clock generator, a data transfer rate of a communication path (e.g., a bus) that couples the controller to the memory 130 may be changed based on one or more operating conditions of the storage device.

The method 600 of FIG. 6 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 600 of FIG. 6 can be initiated or controlled by one or more processors, such as one or more processors included in or coupled to a controller or a memory of the data storage device 110, and/or the access device 101 of FIG. 1. A controller configured to perform the method 600 of FIG. 6 may be able to dynamically adjust a frequency of a clock generator.

Although various components of the data storage device 110, such as the controller 120 (e.g., the performance detector circuit 121, the frequency adjuster circuit, the interface clock 128) of FIG. 1, are depicted herein as block components and described in general terms, such components may include one or more physical components, such as hardware controllers, one or more microprocessors, state machines, logic circuits, one or more other structures, other circuits, or a combination thereof configured to enable the various components to perform operations described herein.

Components described herein may be operationally coupled to one another using one or more nodes, one or more buses (e.g., data buses and/or control buses), one or more other structures, or a combination thereof. One or more aspects of the various components may be implemented using a microprocessor or microcontroller programmed to perform operations described herein, such as one or more operations of the method 600 of FIG. 6.

Alternatively or in addition, one or more aspects of the data storage device 110, such as the controller 120 (e.g., the performance detector circuit 121, the frequency adjuster circuit, the interface clock 128) of FIG. 1 may be implemented using a microprocessor or microcontroller programmed (e.g., by executing instructions) to perform operations described herein, such as one or more operations of the method 600 of FIG. 6, as described further herein. As an illustrative, non-limiting example, the data storage device 1110 includes a processor executing instructions (e.g., firmware) retrieved from the memory 130. Alternatively or in addition, instructions that are executed by the processor may be retrieved from a separate memory location that is not part of the memory 130, such as at a read-only memory (ROM) of the data storage device 110 or the access device 101 of FIG. 1.

In some implementations, each of the controller 120, the memory 130, and/or the access device 101 of FIG. 1 may include a processor executing instructions that are stored at a memory, such as a non-volatile memory of the data storage device 110 or the access device 101 of FIG. 1. Alternatively or additionally, executable instructions that are executed by the processor may be stored at a separate memory location that is not part of the non-volatile memory, such as at a read-only memory (ROM) of the data storage device 110 or the access device 101 of FIG. 1.

With reference to FIG. 1, the data storage device 110 may be attached to or embedded within one or more accessing devices, such as within a housing of the access device 101. For example, the data storage device 110 may be embedded within the access device 101 in accordance with a Joint Electron Devices Engineering Council (JEDEC) Solid State Technology Association Universal Flash Storage (UFS) configuration. To further illustrate, the data storage device 110 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other implementations, the data storage device 110 may be implemented in a portable device configured to be selectively coupled to one or more external accessing devices. For example, the data storage device 110 may be removable from the access device 101 (i.e., "removably" coupled to the access device 101). As an example, the data storage device 110 may be removably coupled to the access device 101 in accordance with a removable universal serial bus (USB) configuration. In still other implementations, the data storage device 110 may be a component (e.g., a solid-state drive (SSD)) of a network accessible data storage system, such as an enterprise data system, a network-attached storage system, a cloud data storage system, etc.

The memory 130 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 130 may include another type of memory. In some implementations, one or more of the memory 130 may include a semiconductor memory device.

Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art. The illustrations of the examples described herein are intended to provide a general understanding of the various aspects of the disclosure. Other implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device comprising:
   an interface circuit configured to be communicatively coupled to a memory;
   a clock generator coupled to the interface circuit and configured to generate a clock signal associated with a data transfer rate of data to be transmitted between the interface circuit and the memory;
   a plurality of transistors;
   a performance detector circuit coupled to the plurality of transistors and configured to determine a performance metric related to a switching speed of at least one of the plurality of transistors, wherein the switching speed is based on a distance a reference signal propagates through the at least one of the plurality of transistors; and
   a frequency adjuster circuit coupled to the performance detector circuit, the frequency adjuster circuit configured to adjust a frequency of the clock signal based on the performance metric.

2. The device of claim 1, wherein the frequency adjuster circuit is configured to output an adjustment signal that indicates to increase the frequency or to decrease the frequency.

3. The device of claim 1, wherein the performance detector circuit comprises a chain circuit that includes the plurality of transistors, the chain circuit configured to receive the reference signal at an input of the chain circuit and to propagate the reference signal through at least a portion of the chain circuit during a time period.

4. The device of claim 3, wherein the performance detector circuit comprises a first latch circuit coupled to a first portion of the chain circuit and a second latch circuit coupled to a second portion of the chain circuit, wherein the first latch circuit is configured to provide a first output that indicates propagation of the reference signal from the input to the first portion and the second latch circuit is configured to provide a second output that indicates propagation of the reference signal from the input to the second portion.

5. The device of claim 3, wherein the time period is based on a period of the clock signal.

6. The device of claim 5, wherein the time period corresponds to a duration of time between a rising edge of the clock signal and a falling edge of the clock signal.

7. The device of claim 3, further comprising a second clock generator configured to generate a second clock signal and to output the second clock signal to the performance detector circuit, wherein the time period is based on a period of the second clock signal.

8. The device of claim 7, wherein the second clock generator comprises phase-lock-loop clock generation circuitry.

9. The device of claim 1, further comprising a second interface circuit configured to be coupled to an access device, the second interface circuit including a power supply input to receive a power supply from the access device, the power supply input coupled to the interface circuit and to the performance detector circuit.

10. The device of claim 9, further comprising core block logic coupled to the interface circuit and to the second interface circuit, the core block logic configured to receive a memory access request from the access device via the second interface circuit and to send a memory access command corresponding to the memory access request via the interface circuit to the memory.

11. The device of claim 1, further comprising:
    the memory;
    a controller that includes the interface circuit and the clock generator; and
    a bus comprising multiple communication channels, wherein the clock generator is configured to provide the clock signal to the memory via at least one communication channel of the multiple communication channels.

12. A device comprising:
    a non-volatile memory configured to store data; and
    a controller communicatively coupled to the non-volatile memory, the controller including a clock generator and a set of transistors, the controller configured to:
    determine a first value of a performance metric, wherein the performance metric is based on a distance a reference signal propagates through at least one transistor of the set of transistors;
    set, based on the first value of the performance metric, a frequency of the clock generator; and
    after the frequency of the clock generator is set, initiate a transfer of data from the non-volatile memory to the controller or from the controller to the non-volatile memory at a data transfer rate based on the frequency.

13. The device of claim 12, further comprising a bus coupled to the non-volatile memory and to the controller, wherein the clock generator is configured to generate a clock signal having the frequency, and wherein the controller is configured to output, based on the clock signal, a data value to the bus.

14. The device of claim 13, wherein the controller is configured to output the data value to the bus responsive to a rising edge of the clock signal.

15. The device of claim 12, further comprising a bus coupled to the non-volatile memory and to the controller, wherein the clock generator is configured to generate a clock signal having the frequency, and wherein the controller is configured to store, based on the clock signal, a data value received via the bus.

16. The device of claim 12, wherein, after completion of the transfer of data, the controller is configured to:
   determine a second value of the performance metric; and
   determine whether to change the frequency of the clock generator based on the second value of the performance metric.

17. The device of claim 12, wherein the controller is configured to determine the performance metric periodically, according to a schedule, or responsive to a memory access request received from an access device.

18. A method comprising:
   determining a first value of a performance metric of a storage device that includes a controller comprising a set of transistors and coupled to a memory, wherein the performance metric is based on a distance a reference signal propagates through at least one transistor of the set of transistors;
   setting, based on the first value of the performance metric, a frequency of a clock generator; and
   performing a transfer of data from the memory to the controller or from the controller to the memory at a data transfer rate based on the frequency.

19. The method of claim 18, further comprising receiving a power supply from an access device coupled to the storage device, wherein a change in a first value of the power supply to a second value of the power supply is due at least in part to a current draw of another device coupled to the power supply.

20. The method of claim 19, wherein the second value is less than the first value.

21. The method of claim 18, further comprising receiving a first memory access request at the controller from an access device coupled to the storage device, wherein the first value of the performance metric is determined responsive to receiving the first memory access request.

22. The method of claim 21, further comprising, after completing the data transfer:
   receiving a second memory access request;
   determining a second value of the performance metric is indicative of an operating speed of the storage device;
   comparing the second value of the performance metric to a threshold; and
   reducing the frequency in response to the second value of the performance metric being less than or equal to the threshold.

23. The method of claim 21, further comprising, after completing the data transfer:
   determining a second value of the performance metric; and
   determining whether to adjust the frequency of the clock generator based on a comparison between the first value and the second value.

24. The method of claim 23, further comprising increasing the frequency in response to determining that the first value is exceeded by the second value.

25. The method of claim 23, further comprising reducing the frequency in response to determining that the first value exceeds the second value.

26. The method of claim 23, further comprising, if the frequency corresponds to a minimum frequency and if the first value exceeds the second value:
   determining a third value of the performance metric;
   comparing the third value to the first value; and
   initiating a second data transfer in response to determining that the third value exceeds or is equal to the first value.

* * * * *